United States Patent [19]

Sasaki

[11] 4,417,689

[45] Nov. 29, 1983

[54] PRESSURE REGULATOR WITH TEMPERATURE COMPENSATION DEVICE

[76] Inventor: Akira Sasaki, 358, Ohganedaira 5-chome, Matsudo-shi, Chiba-ken, Japan

[21] Appl. No.: 381,783

[22] Filed: May 25, 1982

[30] Foreign Application Priority Data

Aug. 31, 1981 [JP] Japan .............................. 56-136741

[51] Int. Cl.³ .......................................... G05D 27/00
[52] U.S. Cl. ................................ 236/92 R; 236/93 R
[58] Field of Search ............... 236/92 R, 93 R, 101 B; 137/468

[56] References Cited

U.S. PATENT DOCUMENTS

| 2,486,644 | 11/1949 | Grosboll | 137/468 X |
| 2,546,571 | 3/1951 | Watson | 236/92 R X |
| 2,590,112 | 3/1952 | MacCracken et al. | 236/93 R X |
| 2,661,243 | 12/1953 | Fox | 236/92 R X |
| 2,829,492 | 4/1958 | Kleinman | 236/92 R X |
| 2,917,067 | 12/1959 | Pearl | 137/468 X |
| 3,053,281 | 9/1962 | Taylor | 236/92 R X |
| 3,270,802 | 9/1966 | Lindberg | 236/92 R X |
| 3,332,436 | 7/1967 | Welty | 137/468 |
| 4,320,871 | 3/1982 | Kuroda et al. | 236/101 B X |

Primary Examiner—William E. Tapolcai
Attorney, Agent, or Firm—Frishauf, Holtz, Goodman & Woodward

[57] ABSTRACT

A pressure regulator for regulating a fluid of varying pressure on the primary side to a constant pressure on the secondary side is provided with a device for compensating the pressure on the secondary side so as to make the regulator capable of delivering a constant quantity of a viscous fluid such as paint irrespective of changes in the temperature of the fluid. The compensating device comprises an inner casing sealed off from the paint passage of the regulator, an assembly of bimetal plates housed within the inner casing and mechanically linked to the valve stem of the regulator, and an auxiliary diaphragm closing the bottom of the inner casing and also linked to the valve stem. The expansion and contraction of the assembly of bimetal plates is applied to the pressure regulating spring of the regulator to change the degree of compression of the pressure regulating spring and thus the fluid pressure on the secondary side in proportion to the temperature of the fluid. The fluid pressure acting on the auxiliary diaphragm is applied to the pressure regulating spring via the valve stem in the direction opposite to the pressure applied to the pressure regulating spring by the main diaphragm of the regulator, thereby in effect reducing the area of the diaphragm and increasing the precision of the regulator.

10 Claims, 10 Drawing Figures

PRESSURE REGULATOR WITH TEMPERATURE COMPENSATION DEVICE

BACKGROUND OF THE INVENTION

1. Field of the Invention

This invention relates to an improvement in the pressure regulator of the type in which the pressure of a fluid on the secondary side of the regulator is maintained at a desired set value regardless of changes in the pressure on the primary side, wherein the improved pressure regulator has, in addition to the aforesaid capability, the capability of automatically compensating said set pressure value in response to changes in the temperature of the fluid so as to maintain constant the quality of a viscous fluid (such as paint) delivered by the regulator.

2. Description of the Prior Art

When, for example, a liquid paint is delivered under pressure to a spray gun for carrying out spray painting, it is common to provide a pressure regulator in the pressurized paint supply line. In this case, since the viscosity of the paint differs with temperature, causing variation in the supply line resistance, the quantity of paint delivered by the regulator will differ at different temperatures if the pressure of the paint on the secondary side is maintained constant. Therefore, in order to maintain a constant supply of paint from the regulator, it has been necessary to regulate the set pressure value of the fluid on the secondary side each time the temperature of the paint changes.

Conventionally, there have been known regulators designed to carry out this regulation automatically through the use of an adjustment mechanism operated by the volumetric change with temperature of a liquid having a large coefficient of thermal expansion, such as alcohol or ether. Such regulators are, however, disadvantageous in that the coefficients of expansion of alcohol, ether and the like are not large enough to cope with large fluctuations in temperature and also in that such liquids are unable to supply adequate power for operating the adjustment mechanism. Moreover, the use of an expanding liquid necessitates the utilization of an arrangement wherein the adjustment mechanism is operated by the movement of a piston rod driven by a piston which in turn is driven by the volumetric change in the liquid with temperature. This means that it is necessary to maintain a cylinder filled with liquid in air-tight condition at all times. With repeated use, however, there arises the danger of the liquid leaking out from gaps developing around the opening through which the piston rod protrudes and it is extremely difficult to provide a perfectly leak-proof structure. The conventional arrangement also creates problems regarding maintenance since any leakage that does occur may lead to an explosion or fire.

Also, most of these conventional pressure regulators employ a diaphragm on which a force is brought to bear by some means or other so as to regulate the pressure of the fluid being passed through the regulator. As a consequence, the operational sensitivity of this diaphragm determines the precision of the pressure regulator as a whole and is critical in determining whether or not the regulator is able to fulfill its purpose sufficiently and reliably. In some cases, depending on the purpose and type of the regulator, the most effective results are obtained with a diaphragm of very small area. From the points of structure and fabrication, however, it is frequently impossible to reduce the area of the diaphragm to the desired degree or, when the area is reduced, the diaphragm is found to entail so many problems regarding service life and sensitivity that it is not practical for use.

SUMMARY OF THE INVENTION

In view of the foregoing observations and descriptions, the primary object of the present invention is to provide a pressure regulator with temperature compensation device which is simple in structure and which is capable of accurately and automatically carrying out both pressure regulation and pressure compensation in response to changes in temperature.

More specifically, the pressure regulator according to the present invention is provided with an assembly of bimetal plates which bend arcuately when subjected to changes in temperature and the collective force and stroke of these bimetal strips caused by such bending is applied to the valve stem of the regulator, whereby the degree of compression of a pressure regulating spring is varied from a preset value corresponding to a preset pressure of the fluid on the secondary side of the regulator. Moreover, the regulator is provided not only with the ordinary pressure regulating diaphragm (hereinafter called the "main diaphragm") but also with an auxiliary diaphragm which is provided on the bottom surface on an inner casing so as to oppose said main diaphragm and receive the pressure of the fluid on the secondary side of the regulator in the direction opposite that in which the pressure is received by the main diaphragm. Thus, as the composite force of the two diaphragms is applied to the valve stem, the effect is substantially the same as that which would be obtained with a single diaphragm of small area.

DESCRIPTION OF THE PREFERRED EMBODIMENT

The invention will now be described with respect to an embodiment of the pressure regulator with pressure compensation device according to this invention intended for insertion into the pressurized supply line of a paint spray can from which it is sprayed onto a substrate to be coated.

Figure 1:
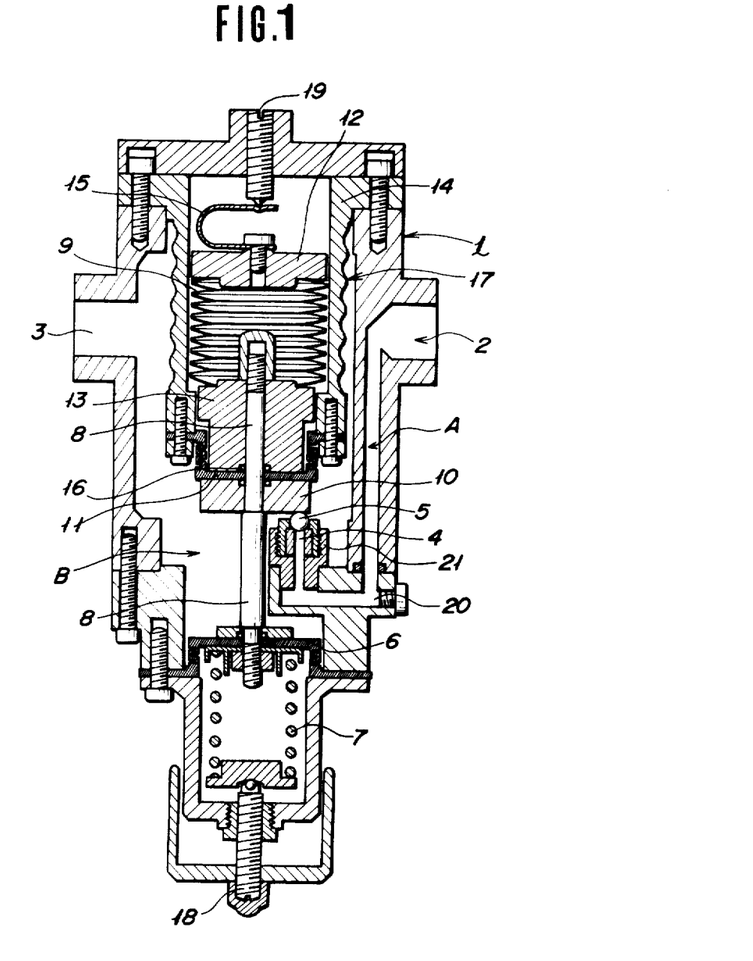
FIG. 1 is a vertical sectional view of an embodiment of the pressure regulator with temperature compensation device according to the present invention.

Referring first to FIG. 1, the regulator according to this embodiment comprises an outer casing 1 which constitutes the main body of the regulator. The outer casing 1 is provided with a paint inlet 2, a primary side fluid passage A communicating therewith, a valve opening 4, and a secondary side fluid passage B communicating the valve opening 4 with a paint outlet 3. The primary side fluid passage A is provided at an appropriate portion thereof with a valve seat 21 on which rests a ball valve element 5. Near the bottom of the outer casing 1 is provided a main diaphragm 6 urged upwardly by a pressure regulating spring 7. Rising upwardly from the center of the main diaphragm 6 is a valve stem 8 having at an intermediate portion thereof a valve pressure plate 10 situated so as to make pressing contact with the top of the valve element 5. Above the valve pressure plate 10 is provided a cylindrical inner casing 14 having an auxiliary diaphragm 11 fixed thereto so as to cover the lower open end thereof. The valve pressure plate 10, a lower washer 13 and the auxiliary diaphragm are arranged to move together with the valve stem 8. At the upper part of the valve stem 8, within the inner casing 14 internally fitted within the outer casing 1, is provided an assembly made up of a plurality of bimetal plates. This assembly of bimetal plates, which is designed to expand and contract in response to temperature changes, is clamped between the washer 13 and an upper washer 12, and is pressed downwardly from the top by an adjustment spring 15. The inner casing 14 is retained within the outer casing 1 by the top cover of the outer casing 1, which cover also closes the upper open end of the inner casing 14. The lower opening of the inner casing 14 is closed by the auxiliary diaphragm 11 and is perfectly sealed off from the paint passage by waterproof seal 16 provided at the point where the valve stem 8 passes through the auxiliary diaphragm 11. The inner casing 14 is formed of a material having good thermal conductivity and is given a wavy configuration on its outer surface 17 so as to be able to rapidly conduct any changes in the temperature of the paint to the assembly of bimetal plates 9. The pressure regulating spring 7 and the adjustment spring 15 are respectively provided with a thumb screw 18 and an adjustment screw 19 by which the force of these springs can be adjusted. In addition, the outer casing 1 is provided at an appropriate position with a drain 20 for draining the paint from the regulator or for flushing the interior of the casing 1.

The main diaphragm 6 and the auxiliary diaphragm 11 are made of resilient material such as Teflon (tradename) which allows their side portions to be formed as bellows.

Figure 2:
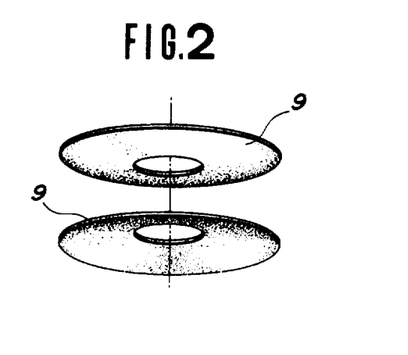
FIG. 2 is a perspective view showing the configuration of bimetal plates used in the temperature compensation device of the embodiment shown in FIG. 1.
Figure 3:
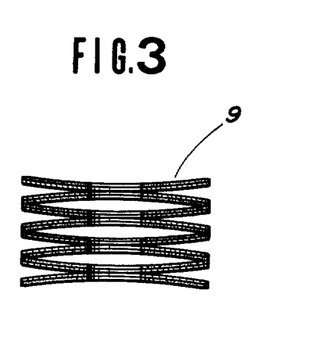
FIG. 3 is an explanatory view showing the arrangement of the bimetal plates into an assembly.

The shape of the bimetal plates 9 and the manner in which they are arranged into an assembly will now be explained with reference to FIGS. 2 and 3. The plurality of bimetal plates made into an assembly and fitted into the inner casing 14 are stacked so that adjacent plates have their surfaces with like coefficients of thermal expansion facing one another. That is to say, the surface with the lower coefficient of expansion of a given plate faces the surface with the lower coefficient of expansion of the adjacent plate on one side, and the surface with the higher coefficient of expansion of the given plate faces the surface with the higher coefficient of expansion of the adjacent plate on the other side so that the plates alternate in the direction in which they face. With this arrangement, the intervals between the adjacent bimetal plates grow larger as the plates deform arcuately with increasing temperature, thus giving a long overall stroke to the assembly. The individual plates are doughnut shaped and are bowed in advance in the direction of deformation with rising temperature so as to form them into the shape of bowls.

By turning the adjustment screw 19, the initial compression on the assembly of bimetal plates 9 can be adjusted via the washer 12.

The operation and effect of the embodiment of the regulator according to the above described embodiment will now be explained. When the pressure of the fluid in the primary side fluid passage A rises and tends to cause an increase in the fluid pressure in the secondary side fluid passage B, the pressure in the passage B acts downwardly on the diaphragm 6, pushing it against the pressure of the regulating spring 7. As a result, the valve stem 8 moves downwardly, causing the valve pressure plate 10 to press down on the valve element 5 so that the valve opening 4 is reduced to reduce the fluid pressure on the secondary side. On the other hand, when the fluid pressure in the secondary side fluid passage B decreases, the pressure regulating spring 7 pushes the diaphragm 6 and the valve stem 8 upward causing the valve pressure plate 10, which is linked to the valve stem 8, to bring less pressure to bear on the valve element 5. As a result the valve opening 4 increases to increase the fluid pressure on the secondary side. Thus, by controlling the size of the opening 4 by means of the valve element 5, the pressure in the secondary side fluid passage B can be controlled to a given set value determined by the pressure regulating spring 7 irrespective of fluctuations in the pressure in the primary side fluid passage A. In this respect the regulator operates in the same manner as the conventional regulator.

Aside from the ordinary pressure regulation just described, the regulator is additionally capable of adjusting the fluid pressure on the secondary side through the stroke developed by the expansion (or contraction) of the assembly of bimetal plates 9 with changes in temperature. More specifically, when the temperature rises, the individual bimetal plates 9 bend arcuately and the collective stroke produced by the assembly of the plates 9 presses down the auxiliary diaphragm 11 and the valve stem 8 and, also, through the valve stem 8, presses down on and compresses the pressure regulating spring 7, meaning that the effective set pressure of the regulating spring 7 is forcibly changed. Therefore, the set value of the fluid pressure on the secondary side can be automatically changed to compensate it for changes in temperature without need to adjust the setting of the thumb screw 18.

In other words, in accordance with the pressure regulator of the present invention, the pressure set by the regulating spring 7 is automatically regulated to compensate it for temperature changes, whereby the fluid pressure on the secondary side of the regulator is automatically decreased when the temperature of the fluid rises and is automatically increased when the temperature of the fluid decreases. Thus, when the pressure regulator according to this invention is inserted in the pressurized paint supply line of a painting apparatus, the delivery pressure at the spray can is automatically changed to compensate it for changes in paint temperature so that the quantity of paint delivered (sprayed) can be maintained constant.

Figure 4:
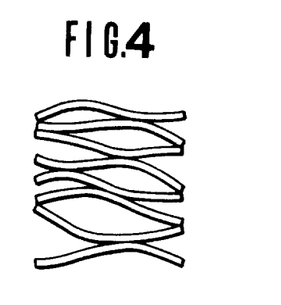
FIG. 4 and FIG. 5 are explanatory views showing the arcuate deformation of ordinary flat bimetal plates arranged into an assembly.
Figure 5:
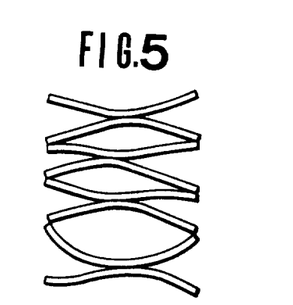

The bimetal plates employed in this invention are not of the ordinary flat type but are doughnut-like disks bowed in the direction of deformation with increasing temperature to give them the shape of bottomless bowls. The use of disks with such configuration avoids the problems of unstable stroke direction and stroke length that would arise with the use of flat disks because of temporary temperature differentials that develop within the plates as a result of the time required for the plates to reach a uniform temperature throughout and because each of the bimetal plates has its own peculiar bending characteristics so that the points of contact between adjacent flat plates would, as shown in FIGS. 4 and 5, be in poor alignment.

By giving the plates a doughnut-like shape it is possible to minimize the irregularity in deformation caused by temperature differentials and the peculiarities of the individual plates. By preforming the plates into the shape of bowls, on the other hand, it is possible to maintain the points of contact between adjacent plates at the inner and outer edges of the doughnut-shaped configuration so as to prevent the shifting of the points of contact during deformation as happens in the case of the flat plates illustrated in FIGS. 4 and 5 and to assure that the expansion (stroke) of the assembly of plates remains stable both in direction and in length. The arrangement according to this invention thus makes it possible to obtain a stronger stroke (downward force on the valve stem 8) due to arcuate deformation of the bimetal plates with an assembly of shorter length than would be possible with an assembly made up of flat bimetal plates.

The operation and effect of the auxiliary diaphragm 11 will now be explained. Although the bimetal temperature compensation device according to this invention is capable of producing a much greater force over a greater length than has been attainable with conventional devices, it is nevertheless ordinarily limited to a force of between 5 and 20 Kg, which is still too small for attaining a sufficient range of compensation for temperature-induced fluid pressure changes in a regulator with a diaphragm of large area. It would be a simple matter to overcome this problem merely by reducing the size of the diaphragm were it not for the fact that it is generally difficult from the points of structure and fabrication to actually reduce the diaphragm area and the fact that even when such a reduction is accomplished it frequently gives rise to problems regarding diaphragm durability and sensitivity.

Therefore, in the present invention there has been provided an auxiliary diaphragm 11 fitted over the bottom opening of the inner casing 14 and mechanically linked to the upper end of the valve stem 8 so that the fluid pressure acts on the auxiliary diaphragm 11 in the opposite direction to that in which it acts on the main diaphragm 6. As a result, the fluid pressure on the main diaphragm 6 is reduced by the amount of the fluid pressure acting on the auxiliary diaphragm 11, whereby the effect obtained is substantially the same as that which would be obtained through the use of a main diaphragm of smaller area.

Various bimetal plate assemblies constructed in accordance with the present invention were tested for their stroke and power characteristics. The results obtained are shown graphically in FIGS. 6, 7 and 8.

Figure 6:
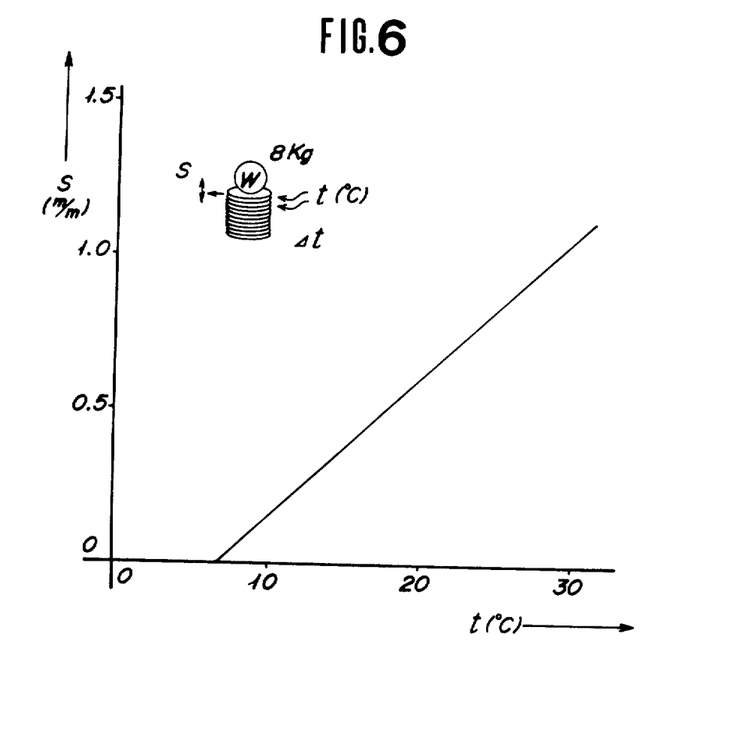
FIG. 6 is a graph showing the stroke characteristics of the assembly of bimetal plates according to this invention.

FIG. 6 shows the stroke characteristics of a bimetal plate assembly formed of 12 plates each having a diameter of 3.5 cm and a thickness of 1.5 mm. The initial load on the assembly was 8 Kg and length of the assembly at 6.5° C. was taken as zero. The rate of temperature increase during the test was 1° C. per two to three minutes.

Figure 7:
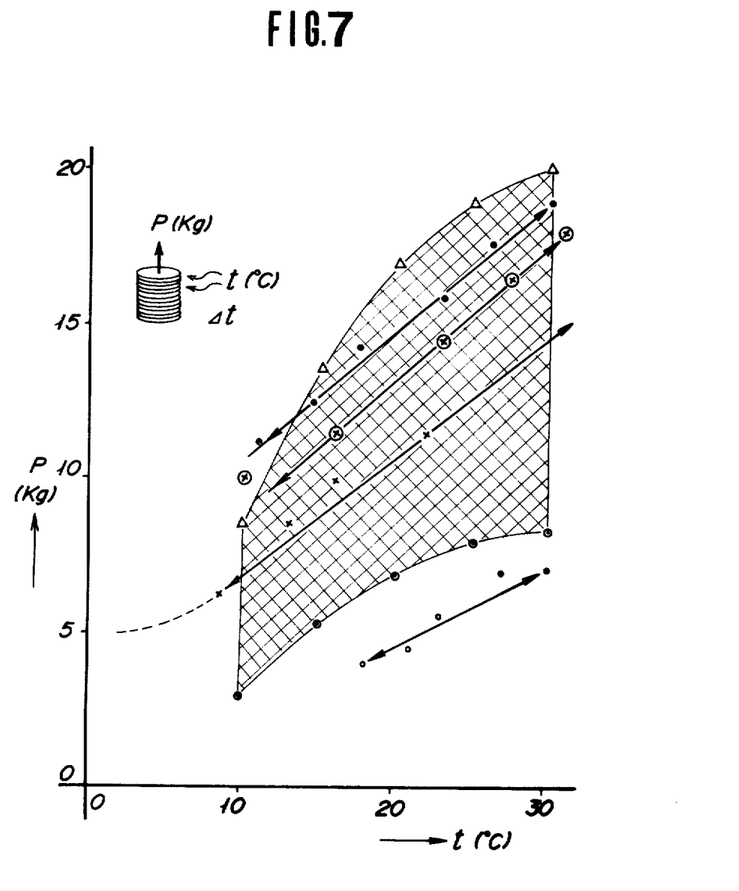
FIG. 7 and FIG. 8 are graphs showing the power characteristics of assemblies of bimetal plates according to this invention.

FIG. 7 shows the power characteristics determined in a cycle test conducted in respect of different bimetal plate assemblies under differing conditions. The size of the individual plates was the same as that in the case of FIG. 6 and the rate of temperature change was 1° C. per minute in all cases. The results shown by solid dots are for a 20-plate assembly having an initial temperature of 14.5° C. and an initial load of 12.5 Kg. Those shown by circled X's are for a 12-plate assembly having an initial temperature of 2.5° C. and an initial load of 5 Kg. Those shown by X's are for a 12-plate assembly having an initial temperature of 11° C. and an initial load of 10 Kg. Those shown by blank circles are for a 10-plate assembly having an initial temperature of 18° C. and an initial load of 4 Kg.

Figure 8:
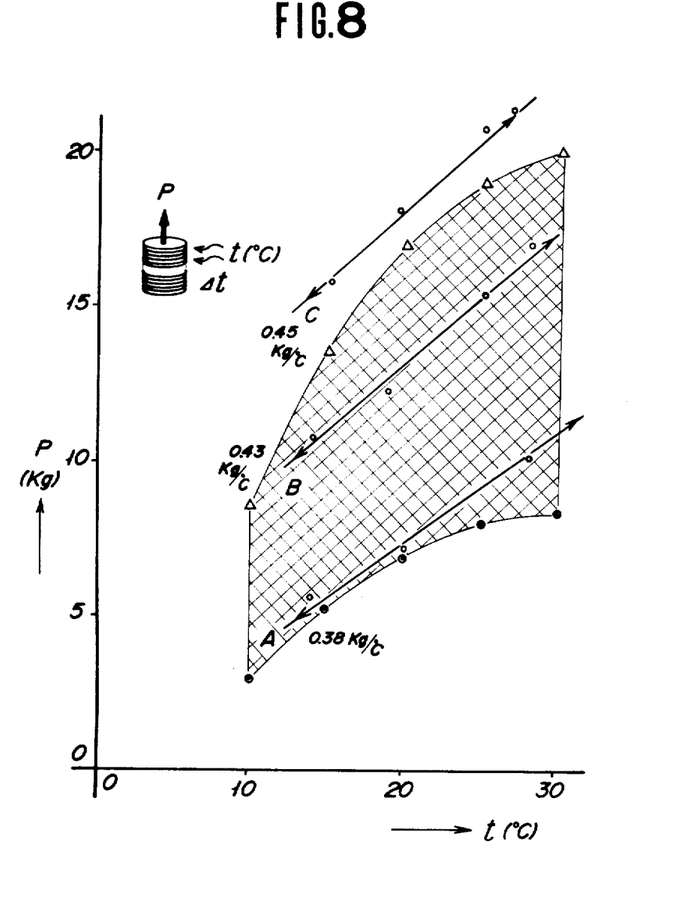

FIG. 8 shows the power characteristics determined in a cycle test conducted under various load conditions in respect of 20-plate bimetal assemblies made up of plates of the same size as those in the case of FIG. 6. The initial temperature was 10° C. and the rate of temperature change was 1° C. per minute in all cases. The results shown by lines A, B and C are those for initial loads of 15 Kg, 10 Kg and 5 Kg, respectively.

Thus as will be noted from the results of these tests, in accordance with the pressure regulator of the present invention, even when the preset pressure of the regulating spring 7 is maintained constant, the fluid pressure on the secondary side is automatically decreased when the temperature of the fluid rises and is automatically increased when the temperature of the fluid decreases. Therefore, when the pressure regulator according to this invention is inserted in the pressurized paint supply line of a painting apparatus, the delivery pressure at the spray can is automatically changed to compensate it for changes in paint temperature so that the quantity paint delivered (sprayed) can be maintained constant.

Figure 9:
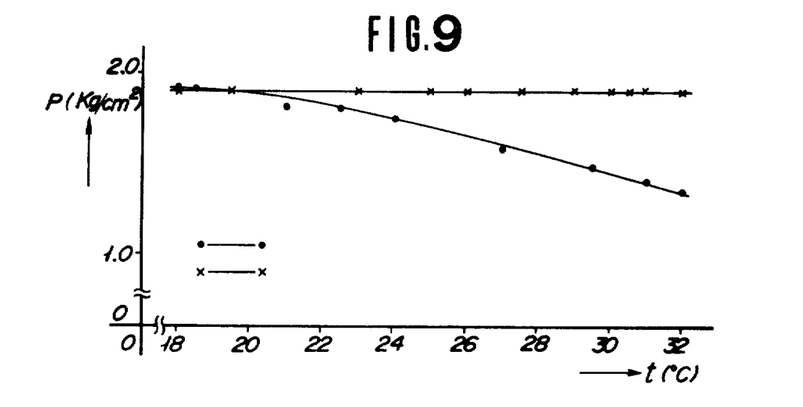
FIG. 9 is a graph showing the relationship between temperature and pressure in the regulator according to this invention and the conventional regulator.
Figure 10:
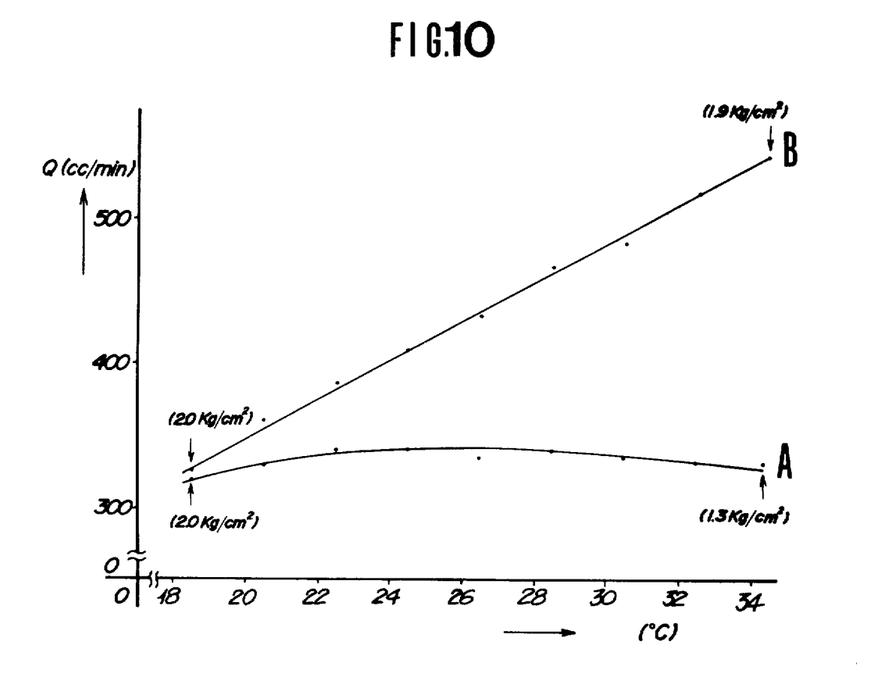
FIG. 10 is a graph showing the relationship between temperature and fluid delivery in the regulator according to this invention with the compensation device in the operative and inoperative states.

The effects of the regulator according to the present invention have been confirmed experimentally and are shown in FIGS. 9 and 10.

FIG. 9 shows the relationship between temperature and pressure in the present invention (solid dots) and in the conventional regulator (X's). It will be noted that in the regulator according to the present invention, the fluid pressure on the secondary side of the regulator drops with increasing temperature.

FIG. 10 shows the relationship between paint temperature and the quantity (Q) of paint delivered by the regulator according to the present invention in the case where the compensation device was in operation (curve A) and the case where the compensation device was made inoperative (curve B). It will be noted that when the compensation device was in operation the fluid pressure dropped pronouncedly with rising temperature so as to keep the quantity of paint delivered relatively constant, whereas when the compensation device was made inoperative, the fluid pressure remained relatively constant in spite of the rise in temperature so that the quantity of paint delivered rose in proportion to the increase in temperature.

The reason for forming the sides of the main diaphragm 6 and the auxiliary diaphragm 11 as bellows made from a resilient resin material such as Teflon is to prevent lateral motion of the valve stem 8, thus assuring that the valve pressure plate 10 presses vertically down onto the valve element 5, and to make it possible to eliminate an otherwise necessary slide pipe for the valve stem 8 and thus to eliminate the hysteresis that would otherwise be likely to develop between the slide pipe and the valve stem 8 during the sliding action. In this way, the regulator is improved in both regulation precision and durability.

In accordance with the pressure regulator of the present invention, the fluid pressure can be adjusted to compensate for changes in fluid temperature, i.e. for changes in fluid viscosity, so as to maintain the quantity of fluid delivered by the regulator constant at all times. As this compensation can be conducted with high accuracy by means of a mechanism of simple structure, the regulator is easy to maintain and has a long service life.

What is claimed is:

1. In a pressure regulator with a temperature compensation device, comprising a main body having primary and secondary side fluid passages, a valve stem coupled to operate a valve, said valve stem extending upwardly from the center of a main diaphragm operated by the opposing forces of a pressure on said secondary side fluid pressure passage within said main body of said regulator and a pressure exterted by a pressure regulating spring, wherein the fluid pressure on the secondary side of said main diaphragm is maintained substantially constant by controlling the opening of said valve through the operation of said valve stem, the improvement comprising:

a cylindrical inner casing formed of a material having good thermal conductivity and provided toward the upper end of said valve stem in a state sealed off from the passages in said main body;

an assembly of bimetal plates in stacked arrangement, opposite sides of said plates having different coefficients of thermal expansion, the sides of adjacent plates having like coefficients of thermal expansion facing each other, said bimetal plates being arcuately bendable responsive to a temperature rise thereof;

a pair of washers for retaining said assembly within said inner casing between said pair of washers;

means for mechanically coupling said valve stem to said assembly of bimetal plates such that said valve stem is pushed downwardly by the expansive stroke of said bimetal plates when said bimetal plates bend arcuately with rising temperature; and means for mechanically coupling said valve stem to said pressure regulating spring to compress said pressure regulating spring when said valve stem is pushed downwardly by said assembly of bimetal plates;

said inner casing having a bottom which comprises an auxiliary diaphragm which is mechanically coupled to said valve stem, said auxiliary diaphragm serving to reduce the fluid pressure acting on said main diaphragm.

2. The pressure regulator with temperature compensation device of claim 1, wherein said auxiliary diaphragm is mechanically coupled to the upper end portion of said valve stem.

3. The pressure regulator with temperature compensation device of claim 1, wherein at least one of said main diaphragm and auxiliary diaphragm are formed of a resilient synthetic resin material and have sides formed as bellows.

4. The pressure regulator with temperature compensation device of claim 3, wherein said synthetic resin material is Teflon.

5. The pressure regulator with temperature compensation device of any one of claims 1, 2 or 3, wherein each of said bimetal plates comprises a generally doughnut-shaped disk bowed in the direction of bending with rising temperature into the shape of a bottomless bowl.

6. The pressure regulator with temperature compensation device of claim 4, wherein adjacent ones of said bimetal plates are bowed in respective opposite directions.

7. In a pressure regulator with a temperature compensation device, comprising a main body having primary and secondary side fluid passages, a valve stem coupled to operate a valve, said valve stem extending upwardly from the center of a main diaphragm operated by the opposing forces of a pressure on said secondary side fluid pressure passage within said main body of said regulator and a pressure exterted by a pressure regulating spring, wherein the fluid pressure on the secondary side of said main diaphragm is maintained substantially constant by controlling the opening of said valve through the operation of said valve stem, the improvement comprising:

a cylindrical inner casing formed of a material having good thermal conductivity and provided toward the upper end of said valve stem in a state sealed off from the passages in said main body, said cylindrical casing having a bottom which comprises an auxiliary diaphragm;

an assembly of bimetal plates in stacked arrangement, opposite sides of said plates having different coefficients of thermal expansion, the sides of adjacent plates having like coefficients of thermal expansion facing each other, said bimetal plates being arcuately bendable responsive to a temperature rise thereof;

a pair of washers for retaining said assembly within said inner casing between said pair of washers;

means for mechanically coupling said valve stem to said assembly of bimetal plates such that said valve stem is pushed downwardly by the expansive stroke of said bimetal plates when said bimetal plates bend arcuately with rising temperature; and means for mechanically coupling said valve stem to said pressure regulating spring to compress said pressure regulating spring when said valve stem is pushed downwardly by said assembly of bimetal plates;

at least one of said main diaphragm and auxiliary diaphragm being formed of a resilient synthetic resin material and having sides formed as bellows.

8. The pressure regulator with temperature compensation device of claim 7, wherein said synthetic resin material is Teflon.

9. The pressure regulator with temperature compensation device of claim 7, wherein each of said bimetal plates comprises a generally doughnut-shaped disk bowed in the direction of bending with rising temperature into the shape of a bottomless bowl.

10. The pressure regulator with temperature compensation device of claim 8, wherein adjacent ones of said bimetal plates are bowed in respective opposite directions.

* * * * *